United States Patent Office 3,375,123
Patented Mar. 26, 1968

3,375,123
PIGMENT PREPARATIONS
Werner Krocker and Roderich König, Riehen, Switzerland, assignors to J. R. Geigy A.G., Basel, Switzerland
No Drawing. Continuation-in-part of application Ser. No. 447,945, Apr. 14, 1965. This application Feb. 11, 1966, Ser. No. 526,717
Claims priority, application Switzerland, Apr. 17, 1964, 5,023/64; Apr. 13, 1965, 5,183/65; Apr. 14, 1965, 5,255/65
14 Claims. (Cl. 106—308)

ABSTRACT OF THE DISCLOSURE

Pigment preparations are provided which consist essentially of
(a) a pigment powder the particle size of which does not exceed 15 microns, and
(b) a coating about each of the pigment particles which coating consists of a mixture of
a metal resinate the metal of which is a member selected from the metals of Groups II and III of the Periodic Table of Mendeleyev, and the resinate moiety being that of an acid selected from the group consisting of dihydroabietic acid and a tetrahydroabietic acid, and the partial esterification products of these acids with aliphatic saturated alcohols of from 1 to 6 carbon atoms and from 1 to 6 hydroxyl groups per molecule, said partial esterification products having an acid number of at least 80, and
an ammonium resinate, the resinate moiety of which is that defined under (b) and the ammonium moiety of which is the radical of an organic amine.
The ammonium resinate/metal resinate mixture is substantially insoluble in water, but is at least colloidally dispersible in the organic solvent constituent of gravure printing ink. The pigment preparations provided are readily dispersible preparations. The pigment preparations are useful in connection with printing inks, lacquers and plastics. There is also provided a process for the production of the new pigment preparations, as well as, industrial products, the printing inks, lacquers and plastics containing the pigment preparations of the invention.

This is a continuation-in-part application of our copending application Ser. No. 447,945, filed Apr. 14, 1965, now abandoned.

The present invention concerns new pigment preparations, a process for the production thereof, their use in printing inks, lacquers and plastics as well as, as industrial products, the printing inks, lacquers and plastics containing the pigment preparations according to the invention.

Pigments which are to be used for printing inks must be distributed extraordinarily finely in binding agents or "vehicles" therefor. The necessary fine distribution has been attained up to the present by intensively milling the pigment in binding agents. However, such milling operations required a great deal of time and apparatus, so that the need was felt for pigment preparations which would be more readily distributable in binding agents, and would require less or no grinding during their introduction into the vehicle.

Therefore, according to known processes, pigment preparations were produced in which the individual pigment particles are coated with a natural resin. Such preparations are, for instance, obtained by precipitating a metal resinate of natural resins which is only slightly soluble in water from an aqueous solution into the finely distributed pigment by reacting a water-soluble salt of the corresponding natural resin acids with water soluble calcium or barium salts.

Such pigment preparations can be relatively easily distributed in the binding agents, e.g. by stirring or milling therewith for a short time, but they have the disadvantage that they are not very stable on storing because the natural resin is easily oxidized whereby the particles lose dispersibility and discolorations occur. Also, pigment preparations have already been produced by precipitating resins in an aqueous suspension of finely distributed pigment particles, to deposit a resin coating on the latter, in the presence of fatty acids emulsified or dissolved in the said suspension to enhance the dispersion of the pigments. However, such pigment preparations have the disadvantage of bad dispersibility in organic solvents being constituents of printing inks, especially gravure printing inks, and are too highly viscous when dispersed in such solvents. Moreover, known pigment preparations of this type, including those which contain long-chain amines of fatty acids such as oleic acid, suffer from the drawbacks of deficient storage stability, higher solvent retention, correspondingly deficient dyeing properties, and blocking of the prints.

It has now been found that pigment preparations which are free from the above-mentioned drawbacks and are especially quick-drying, stable on storing and easily distributable in most of the usual binding agents and solvents forming vehicles in printing inks are obtained by mixing and thereby reacting (a) an aqueous solution of a water-soluble salt of monomeric, dimeric or higher polymeric di-hydroabietic or tetrahydroabietic acid and/or partial esterification products of these acids with aliphatic saturated alcohols of from 1 to 6 carbon atoms and from 1 to 6 hydroxyl groups per molecule, said partial esterification products having an acid number of at least 80, which solution is free from fatty acid or fatty acid salts, and (b) an aqueous solution of a water-soluble salt of a metal of Group II or III of the Periodic Table of Mendeleyev, and an acid addition salt of an aliphatic amine which is capable of forming with the aforesaid acid in the solution (a) a salt which is insoluble or only slightly soluble in water, but which is at least colloid-dispersible or soluble in the organic solvent constituent or constituents of printing inks, lacquers or plastics, especially of gravure printing inks, wherein at least one of the reactant solutions (a) or (b) contains in suspension finely dispersed particles of the pigment to be treated, whereby in the resulting mixture a metal resinate which is free from fatty acid and is insoluble in water, but readily colloid-dispersible or even soluble in the aforesaid printing ink, lacquer or plastic organic solvent constituent or constituents, is precipitated in the resulting mixture of (a) and (b) and forms a coating on each fine pigment particle in the mixture.

The metal resinate coating is thus a water-insoluble, colloidally solvent-dispersible salt of a metal as defined under (b) and an acid or acids as defined under (a).

The use of aqueous solution as defined under (b) above in the production of pigment preparations according to the invention leads to pigment compositions in which the pigment particles are coated with a mixture of metal resinate and N-substituted ammonium resinate which imparts a surprising advantage to printing inks into which it has been incorporated, in that these inks show a very good solvent release from the prints, e.g. on paper, plastic foils, metal foils and other suitable substrates. Due to the fact that the pigments themselves are already in a finely dispersed state in the compositions according to the invention and require no after-grinding, such compositions are also referred to as being "predispersed."

Examples of water-soluble salts of di- and/or tetra-hydroabietic acids used according to the invention are the sodium, potassium or ammonium salts; preferably the potassium salts of these acids are used because they have relatively good water-solubility. The potassium salts of dihydroabietic acid and of tetrahydroabietic acid, or mixtures of such acids have proved to be particularly suitable. These di- and tetra-hydroabietic acids occur as monomers and as dimers.

Such mixed acids can be characterized by the thiocyanogen value, the acid number and the hydrogenation value. Mixtures of these acids are commercially available under such trade names as Staybelite and Dymerex and such commercial products are suitable for use in the preparations according to this invention. Complete chemical purity is not required. Examples of partially esterified products are the esters of the acids mentioned with low monovalent aliphatic alcohols, particularly alkanols such as methanol or ethanol, with aliphatic diols such as alkylene glycols, e.g. ethylene glycol, or with aliphatic polyols, e.g. glycerin or pentaerythrite.

Water-soluble alkaline earth metal salts which are preferred as water-soluble salts of Groups II and III which form very slightly water-soluble resinates with the resin acids mentioned are, e.g. the chlorides or acetates of beryllium, magnesium, calcium, strontium and barium; water-soluble aluminum salts, e.g. potassium aluminum sulfate; and zinc salts such as zinc chloride are also useful for the same purpose and readily available, while other metals of Groups II and III, although also usable, are of little or no commercial interest.

Aliphatic amines, water-soluble acid addition salts of which are useful in the solution containing the water-soluble metal salts defined under (b) above are derived from alkylated or alkenylated primary, secondary or tertiary aliphatic or alicyclic mono- or polyamines. Especially usable aliphatic mono-amines usable according to the invention are mono- and di-alkyl or -alkenyl amines, the first alkyl or alkenyl group of which has from 4 to 18, or even up to 20, and preferably from 12 to 18 carbon atoms, while the second alkyl or alkenyl group can have from 1, or in the case of alkenyl, 2 to 18 carbon atoms; preferably, dialkyl- or dialkenyl amines should contain a total of at least 4 and up to 18, and still more preferably at least 12 and not more than 18 carbon atoms, such as butylamine, N,N-diisobutylamine, N-dodecyl-N-methylamine, hexylamine, decylamine, cetylamine, N,N-diisobutyl-N-methylamine, N-stearyl-N,N-dimethylamine or amino-substituted polyalkyl-polyhydro-phenanthrones; such as dihydroabietyl-amino or tetrahydroabietylamine, oleylamine, coconut oil fatty amine or stearylamine, mono- or di-cycloalkyl amines such as cyclohexylamine, dicyclohexylamine or N-cyclohexyl-N,N-dimethylamine; and mono- or di-aralkyl amines such as benzylamine, phenylethylamine or dibenzylamine, N-benzyl-N-methylamine or N,N-dibenzylmethylamine. Examples of aromatic amines are: phenylamine, N-phenyl-N-methylamine, N,N-di-o-toluylamine, N,N-dimethyl-N-phenylamine, N-methyl- or N-ethyl-N-benzyl-phenylamine as well as diphenyl guanidine or di-o-toluyl guanidine. Examples of alicyclic mono- or polyamines which have also been found to be particularly suitable as such aliphatic amines are morpholine, piperazine, piperidine and imidazoline, preferably 2 - alkyl-imidazolines, especially 1-β-hydroxy-ethyl-2-undecyl-, 1-β-hydroxy-ethyl-2-heptadecenyl- and 1-β-hydroxy-ethyl-2-heptadecylimidazoline. Alkylated or alkenylated polyamines which are usable according to the invention are for example alkylenediamines, dialkylenetriamines and trialkylene-tetramines, especially triethylene-tetramines and tetra-alkylene pentamine in which the divalent "alkylene" groups have from 2 to 4 carbon atoms and the nitrogen atoms are unsubstituted or preferably, further, especially mono-substituted by alkyl or alkenyl groups of from 1 or, in the case of alkenyl, 2 to 18 carbon atoms. Preferably not more than one such alkyl or alkenyl group substituent of higher carbon number is present in one amino nitrogen atom per molecule of the aforesaid amines. Examples of such especially usable polyamines are ethylenediamine, 1,3-propylenediamine, 1 - dimethylaminopropylene-3-amine, diethylenetriamine, triethylenetetramine, tetraethylenepentamine, N-oleylethylene or N-oleyl-propylenediamine or N-stearyl-ethylene diamine or N-stearyl-propylenediamine.

Particularly suitable acid addition products are derived from primary and secondary aliphatic amines, e.g. from the mixture known by the generic term "coconut oil fatty amine," and from cyclic amines.

As examples of water-soluble salts of such aliphatic amines we mention the hydrochlorides and acetates.

The principal criterion for the suitability of an aliphatic amine is the capability of the resulting resinate derived from one of the aforesaid resinous acids or a mixture of several thereof, to disperse as a colloid or even to dissolve in it least one and preferably several or all of the following classes of solvent constituents of printing inks:

(a) aromatic hydrocarbons which are preferably liquid at room temperature (about 25° C.) and the boiling point of which is not higher than about 200° C., among these benzene, toluene, xylenes, vinyltoluene and styrene are preferred;

(b) aliphatic hydrocarbons which are preferably liquid at room temperature and the boiling point of which does not exceed 200° C.; preferred solvents of this class are benzine fractions boiling e.g. at a range of 80° to 110° C.;

(c) mono- and polyvalent alkanols of from 1 to 8 carbon atoms, ethanol being preferred;

(d) aliphatic ketones, the carbon number of which does not exceed 8; acetone and methyl-ethyl ketone are preferred;

(e) esters of lower alkanols and alkanoic acids in which the alkyl moiety has from 1 to 6 carbon atoms and the acyl moiety from 1 to 3 carbon atoms, ethyl acetates, ethyl formiate and ethyl propionate being preferred;

(f) aliphatic ethers of from 1 to 8 carbon atoms; ethylene glycol mono-methyl- or ethyl ether being preferred.

Inorganic as well as organic pigments are used in the process according to the invention, the latter being preferred. Examples of inorganic pigments are white pigments such as titanium dioxide, zinc oxide, zinc sulfide or barium sulfate; black pigments such as carbon black; or colored mineral pigments, for example iron oxide yellow, cadmium sulfide or chrome yellow, or basic mineral pigments, e.g. minium.

The organic pigments used in the preparations according to the invention which should be readily suspendable in aqueous solutions as defined above and should therefore be of particle sizes preferably not exceeding 15 microns, can belong to the chemical classes of dyestuffs usually in pigments. Examples thereof are azo pigments which can be metal-free or can contain metal bound in complex linkage, e.g. chromium, cobalt or copper complexes, or laked acid groups, e.g. sulphonic acid groups which have formed lakes with calcium, barium or manganese; other pigment classes are the dioxazines, quinacridones, phthalocyanines, anthraquinones, indigoids, lakes of basic dyestuffs, azomethines, e.g. tetrachloroisoindolinone derivatives, or metal complexes of nitroso-napthols.

Mixtures of such pigments can also be used in the pigment compositions according to the invention.

In the production of the coatings of insoluble metal resinate precipitated onto the pigment particles, it is advantageous to prepare first a 1 to 25%, preferably an about 5 to 15%, aqueous solution of the water-soluble salt of the above-described monomeric or polymeric di- or tetrahydroabietic acids, partial esters of these acids or mixtures thereof, to disperse the pigment in this solution and then to add a solution of a mixture of the water-soluble metal salt of a metal of Groups II or III, as previously defined, and a water-soluble addition product of an organic amine as defined under (b) to the resulting solution.

The sum of the contents of the water-soluble metal salt and the water-soluble amine as defined under (b) in a solution is preferably about equivalent to the amount of the resin acids contained in solution (a).

The equivalence ratio of water-soluble metal salt to water-soluble amine in solutions defined under (b) is at least about 1:9 in order to achieve the desired solvent releasing effect.

For practical purposes, equivalence ratios of water-soluble metal salt to water-soluble amine in the range from 1:9 to 3:1, and preferably of from 1:3 to 3:1 are recommended, while the invention also comprises a higher proportion of water-soluble metal up to 4:1. At higher ratios the desirable combination between good solvent-releasing effect and higher dispersibility of the mixed resinate coating is no longer assured.

The weight ratio of metal resinate/ammonium resinate mixture to pigment depends largely on the specific surface of the latter and should be at least about 10:90 in the case of inorganic pigments and greater, namely 15:85 or higher in the case of organic pigment dyestuffs.

In pigment preparations according to the invention which are defined for use in printing inks, a range of ratios of from 25:75 to 60:40 is preferred.

As a result, the water-insoluble mixed metal/ammonium resinate precipitates and coats the individual particles of pigment. The resulting precipitate of pigment/metal resinate/ammonium resinate is separated by filtration and soluble inorganic salts are removed from the filter cake by washing with water. In this way, strongly colored pigment preparations are obtained which—because they are free of corrosive salt—do not attack metal surfaces of apparatus such as, e.g. low pressure copper cylinders.

In contrast to known resin-coated pigment preparations, especially those containing fatty acids, pigment preparations produced according to the invention can be readily distributed by stirring for only a short time in binding agents, vehicles and solvent constituents of printing inks, even after the aforesaid preparations have been stored for several months. In particular, they possess much greater stability to oxidative influences than the known preparations and a much longer storage-life.

Moreover, the pigment preparations according to the invention do not suffer from the high solvent retention of the closest known pigment preparations, but dry rapidly, and especially those containing N-lower alkyl-ammonium resinates, are practically odorless while known pigments containing N-loweralkyl ammonium oleates and the like fatty acid derivatives often have a strong odor.

It is also particularly surprising that the metal resinate component of the pigment preparation according to the invention dissolves very well in most organic solvents. Due to this property, pigment preparations according to the invention can be dispersed well in most binding agents and solvents used in printing inks, and are therefore excellently suitable for use in such inks. Of course, they can also be used in lacquers and synthetic plastic polymer materials.

Examples of materials other than printing inks which can be colored with the pigment preparations according to the invention are those of natural origin such as natural resins, drying oils and rubber. Other such materials are modified natural substances such as chlorinated rubber, oil-modified alkyd resins or the various cellulose derivatives such as acetyl cellulose and nitrocellulose; or synthetic organic polymeric materials, obtained by polymerization, polycondensation and polyaddition. The following are mentioned from this latter class: polyethylene, polypropylene, polystyrene, polyvinyl chloride, polyvinyl acetate, polyacrylonitrile esters, polyacrylic acid esters and polymethacrylic acid esters; polyesters, particularly high molecular esters of aromatic polycarboxylic acids with polyfunctional alcohols; polyamides; the condensation products of formaldehyde with phenols, the so-called phenolic resins, and the condensation products of formaldehyde with urea, thiourea and melamine, the so-called amino plastics; the polyesters used as resins for paints and varnishes, i.e. both the saturated resins such as alkyd resins as well as the unsaturated resins such as maleinate resins, and finally the polyaddition or polycondensation products of epichlorohydrin with diols or polyphenols known as epoxide resins.

Examples of solvents used in lacquers, varnishes, paints and the like compositions which can be colored with the pigment preparations according to the invention are aromatic hydrocarbons usch as benzene, toluene, xylene, vinyltoluene or styrene, hydroaromatic and aliphatic hydrocarbons inclusive of benzene and terpene hydrocarbons, but especially mono- and polyvalent aliphatic alcohols, e.g. ethanol, isopropanol, butanol, benzyl alcohol, octyl glycol; aliphatic ethers, e.g. ethylene glycol monomethyl or monoethyl or monobutyl ether; aliphatic esters, e.g. ethyl acetate, ethyl formiate or ethyl propionate; or aliphatic ketones such as acetone, methyl-ethyl ketone and methylisobutyl ketone.

Due to their easy dispersibility and stability to oxidation, the new pigment preparations can be used in many ways; in particular they are well suited for the gravure printing industry, particularly for use in intaglio printing inks as, in the printing inks containing pigment preparations according to the invention, the solvent is very easily volatilized, particularly in prints produced on paper, plastic or metal foils.

"Slightly soluble" as used in this specification means that 1 part of the substance to be dissolved is soluble in from about 100 to 1000 parts of solvent. "Very slightly soluble" means that 1 part of the substance in question is only soluble in more than 1000 parts of solvent.

The following non-limitative examples serve to illustrate the invention further. The temperatures are given therein in degrees centigrade and parts and percentages are given by weight unless otherwise stated.

All of the pigment preparations described in these examples as well as in the examples illustrating subsequently described aspects of this invention possess the advantageous properties set forth hereinbefore.

*Example 1*

604 parts of dimeric dihydroabietic acid are boiled together with 112 parts of potassium hydroxide and 5400 parts of water until a homogeneous solution is obtained which is filtered. The 14,000 parts of α-copper phthalocyanine in the form of an aqueous press cake of 25% pigment content are worked in by means of the turbomixer and dispersed homogeneously. Subsequently a solution of 257 parts of the product obtained by full hydrogenation of the condensation product of coconut oil fatty acid and trimethylene diamine (mole ratio 2:1, 80% active content), 162 parts of aqueous 36% hydrochloric acid and 27.2 parts of zinc chloride in 2000 parts of water are added. The resulting mixture is stirred for 30 minutes, then the precipitate formed separated by filtration, freed from salt by washing and dried. A blue pigment composition is obtained which is easily dispersible in binding agents and solvents used in printing inks and lacquers.

In an analogous manner as described in Example 1, there are obtained the folowing pre-dispersed pigment preparations, by using in the said example the corresponding amounts of the respective ingredients: (resinate stands for the salt of a mixture of monomeric and dimeric di- and tetra-hydroabietic acids, characterized by a thiocyanogen value of 35, a hydrogenation value of 71 ml./g. and an acid number of 162.

(a) 225 parts of butyl-ammonium resinate
25 parts of strontium resinate
750 parts of the 2-nitrosonaphthol iron complex.

This green pigment preparation shows good collodial dispersibility in toluene, benzene, ethanol, acetone and ethyl acetate.

(b) 250 parts of aluminum resinate
750 parts of stearyl-ammonium resinate
5660 parts of the pigment 4-chloro-1-aminobenzene→1,3-dihydroxyquinoline nickel lake.

This green-golden preparation shows good collodial dispersibility in binding agents and solvents used in printing inks and lacquers.

(c) 800 parts of calcium resinate
200 parts of cetyl-ammonium resinate
667 parts of quinacridone, β-form.

This red pigment preparation shows good collodial dispersibility in toluene, benzine and ethanol.

(d) 250 parts of hexyl-ammonium resinate
375 parts of calcium resinate
375 parts of zinc resinate
1000 parts of the yellow pigment 4,4'-dichloro-3,3'-diaminobenzyl⇌acetoacetyl-(4 - methyl - phenylamide).

This yellow pigment preparation is readily collodially dispersible in binding agents and solvents used in printing inks and lacquers.

(e) 150 parts of magnesium resinate
750 parts of propylene-diammonium resinate
2000 parts of the pigment 3,3'-dichlorobenzidine⇌1-(4-methylphenyl)-3-methyl-5-hydroxypyrazole.

This orange pigment preparation is readily dispersible as a colloid in binding agents and solvents used in printing inks and lacquers.

(f) 200 parts of beryllium resinate
800 parts of N,N-dimethylamino-propylammonium resinate
2000 parts of the pigment 3,3'-dichlorobenzidine⇌1-phenyl-3-carboethoxy-5-hydroxypyrazole.

This red pigment preparation shows good colloidal dispersibility in toluene, benzine, ethanol and acetone.

(g) 100 parts of barium resinate
900 parts of diisobutyl-ammonium resinate
9000 parts of titanium dioxide.

This white pigment preparation has good colloidal dispersibility in binding agents and solvents used in printing inks and lacquers.

(h) 500 parts of calcium resinate
500 parts of resinate of diethylene triamine (mole ratio 3:1)
7000 parts of crystal violet laked with phosphotungsten molybdic acid.

This violet pigment preparation is readily dispersible colloidally in toluene, ethanol and acetone.

(i) 250 parts of calcium resinate
250 parts of zinc resinate
600 parts of resinate of tetraethylene-pentamine (mole ratio 4:1)
3300 parts of iron oxide yellow.

This yellow pigment preparation is readily colloidally dispersible in binding agents and solvents used in printing inks and lacquers.

(j) 100 parts of magnesium resinate
200 parts of zinc resinate
250 parts of dicyclohexylammonium resinate
1100 parts of carbon black.

This black pigment preparation shows very good colloidal dispersibility in binding agents and solvents used in printing inks and lacquers.

(k) 50 parts of calcium resinate
450 parts of the mixed polyhydro-phenanthrene amine consisting of amines of the formulas

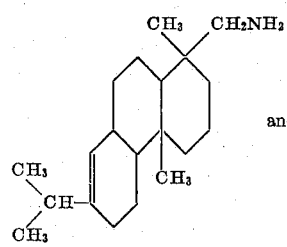 and 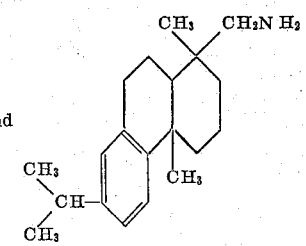

in a mole ratio of about 1:1 and
2000 parts of rhodamine laked with phosphotungsten molybdic acid This violet pigment preparation is very well dispersible as a colloid in binding agents and solvents used in printing inks and lacquers.

(l) 100 parts of zinc resinate
400 parts of resinate of tert. dodecyl-diethylene-triamine (mole ratio 3:1)
2000 parts of chrome yellow This yellow pigment preparation is readily colloidally dispersible in binding agents and solvents used in printing inks and lacquers.

(m) 100 parts of calcium resinate
100 parts of zinc resinate
300 parts of morpholinium resinate
1500 parts of hexadecachloro-copper phthalocyanine This green pigment preparation is readily colloidally dispersible in binding agents and solvents used in printing inks and lacquers.

Example 2

606 parts of dimeric tetrahydroabietic acid are heated in 80 parts of sodium hydroxide and 5400 parts of water until a homogeneous solution is obtained which is filtered and then homogeneously mixed in the turbomixer with 8980 parts of the pigment 2-nitro-p-toluidine→2-naphthol in the form of a press cake of 30% solids content. To this pigment dispersion there is added, with continuous stirring, a solution of 283.5 parts of decylamine, 180 parts of aqueous 36% hydrochloric acid, 13.6 parts of zinc chloride and 2500 parts of water. The resulting mixture is stirred for 30 minutes, the precipitate formed filtered off, freed from salt by washing and dried. A red pigment composition is obtained which is easily dispersible in binding agents and solvents used for prnting inks and lacquers.

Example 3

346 parts of a resin mixture consisting of mono- and dimeric di- and tetrahydroabietic acids, of acid number 162, melting point (determined according to the ASTM Ring and Ball method) 70° C., and refractive index 1.5008 at 100° C., are boiled together with 56 parts of potassium hydroxide and 300 parts of water until a homogeneous solution is obtained which is purified by filtration. Then 2960 parts of the calcium salt of the pigment 6-amino-4-chloro-m-toluene-sulphonic acid → 3-hydroxy-2-naphthoic acid in the form of a press cake of 24% solids content are stirred into the filtrate by means of a turbomixer and, after complete dispersion, mixed with further continuous stirring with a solution of 125 parts of decylamine in 100 parts of 37% acetic acid and 11.1 parts of $CaCl_2$ and 1250 parts of water. The resulting mixture is stirred for another 30 minutes, then the precipitate formed is filtered off, freed from salt by washing and dried. A red pigment composition is obtained which is easily dispersible in binding agents and solvents used for printing inks and lacquers.

*Example 4*

100 g. of a resin mixture consisting of dimeric di- and tetrahydroabietic acids, e.g. Dymerex (a commercial product of Hercules Powder, Wilmington, Del., U.S.A.) are boiled in 900 ml. of 1.67% potassium hydroxide solution until a homogeneous solution is obtained which is purified by filtration. 2000 g. of copper phthalocyanine in the form of a press cake of 18.8% solids content are dispersed in this filtrate by means of a high-speed pebble mill. This dispersion is then mixed with 890 g. of a solution of 89 g. of the amine of the formula

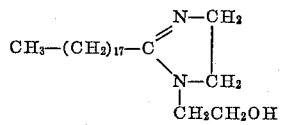

in 801 g. of aqueous 2.5% hydrochloric acid and 6.8 g. of $ZnCl_2$, dissolved in 100 g. of water, and the whole is worked up in the manner described in Example 1. A blue pigment composition is thus obtained which is well dispersible in binding agents and solvents.

*Example 5*

100 g. of a resin mixture consisting of mono- and dimeric di- and tetrahydroabetic acids, e.g. Staybelite, (Hercules Powder, Wilmington, Del., U.S.A.) are boiled in 900 ml. of 1.80% potassium hydroxide solution until a homogeneous solution is obtained into which are stirred 2000 g. of 5-chloro-4-methyl-2-amino-benzene-sulphonic acid→2-hydroxynaphthalene barium lacquer in the form of a 22% press cake. With continuous stirring, the dispersion obtained is mixed with 78 g. of zinc chloride solution, followed by 236 g. of a solution consisting of 32.6 parts of N-oleyl-propylene-diamine dissolved in 203.4 parts of a 1.64% hydrochloric acid. The whole is worked up in the manner described in Example 1. The red pigment composition thus obtained is dispersible in solvents and binding agents.

The same result is obtained if, in the above Example 5, instead of zinc chloride an equivalent amount of calcium chloride, beryllium chloride, magnesium chloride, strontium nitrate, barium chloride or potassium aluminium sulphate is used and if, instead of a mixture of monomeric and dimeric di- and tetra-hydroabietic acids, an equivalent amount of monomeric dihydroabietic acid, monomeric tetrahydroabietic acid or dimeric tetrahydroabietic acid is used.

If in Examples 1 to 5, instead of the pigments therein mentioned, any one of the pigments given in the following table is used and otherwise the pigment preparation is produced as described in Examples 1 to 5, then pigment preparations are obtained which are also easily dispersible. Their shade is given in the last column of the table.

TABLE

| Example | Pigment | Shade of the pigment preparation |
|---|---|---|
| a | 4-nitro-1-aminobenzene→acetoacetylphenylamide | Yellow. |
| b | 4-chloro-2-nitro-1-aminobenzene→acetoacetyl-(2-chlorophenyl-amide). | Do. |
| c | 4-chloro-1-aminobenzene→1,3-dihydroxyquinoline nickel lake | Yellow-green. |
| d | 2-chloro-4-nitro-1-aminobenzene→2-hydroxynaphthalene | Red. |
| e | 2,5-dichloro-1-aminobenzene→2-hydroxynapththalene-3-carboxylic acid-(2-methoxyphenylamide). | Red. |
| f | 5-chloro-4-methyl-2-aminobenzene-1-sulphonic acid→2-hydroxynaphthalene, barium lake. | Red. |
| g | 4,4'-dichloro-3,3'-diaminobenzil⇌acetoacetyl-(4'-methyl-phenylamide). | Yellow. |
| h | 3,3'-dichlorobenzidine⇌acetoacetylphenylamide | Do. |
| i | 3,3'-dichlorobenzidine⇌acetoacetyl-(2,4-dichlorophenylamide) | Do. |
| j | 3,3'-dichlorobenzidine⇌1-(4-methylphenyl)-3-methyl-5-hydroxypyrazole. | Orange. |
| k | 3,3'-dichlorobenzidine⇌1-phenyl-3-carboethoxy-5-hydroxy-pyrazole. | Red. |
| l | Aniline Black (C.I. 50440) | Black. |
| m | bis-[4,5,6,7-tetrachloroisoindolin-1-one-3-ylidene]-diphenyl-enediamine-(4,4'). | Orange. |
| n | bis-[4,5,6,7-tetrachloroisoindolin-1-one-3-ylidene]-3,3'-dimethoxy-diphenylenediamine-(4,4'). | Red. |
| o | Isoviolanthrone Violet (isodibenzanthrone, Venkataraman, "Chemistry of Synthetic Dyes" II, p. 974 et seq.). | Violet. |
| p | Copper phthalocyanine | Blue. |
| q | Hexadecachloro-copper phthalocyanine | Green. |
| r | Indanthrene blue (Karrer, "Organische Chemie," page 657) | Blue. |
| s | Quinacridone, γ-form | Carmine. |
| t | Quinacridone, β-form | Violet. |
| u | 1,4-dihydroxyanthraquinone-2-sulfonic acid, aluminum lake | Do. |
| v | 2-nitrosonaphthol iron complex | Green. |
| w | Indanthrene Brilliant Orange GR, of the formula | Orange |

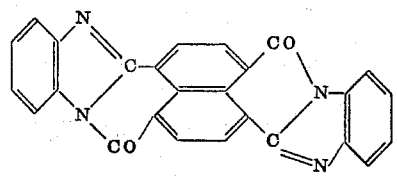

TABLE—Continued

| Example | Pigment | Shade of the pigment preparation |
|---|---|---|
| x | Rhodamine of the formula [structure: xanthene with $(C_2H_5)_2N$, $N(C_2H_5)_2$, $CH_3$, $COOC_2H_5$, phenyl] laked with phosphotungsten molybdic acid | Red. |
| y | Crystal violet, of the formula [structure: triphenylmethane with $(CH_3)_2N$, $N(CH_3)_2$] laked with phosphotungsten molybdic acid | Violet. |
| z | Thioindigo, of the formula [structure with Cl, CO, S, $CH_3$, C=C] | Bordeaux. |
| aa | Mixture of bis-[4,5,6,7-tetrachloroindolin-1-one-3-ylidene]-1-methylphenylenediamine and microcrystalline copper phthalocyanine in the β-form in weight ratio of 1:1. | Green. |
| bb | Titanium dioxide | White. |
| cc | Iron oxide yellow, Fe(O)OH | Yellow. |
| dd | Cadmium sulphide | Do. |
| ee | Chrome yellow, $PbCrO_4$ | Do. |
| ff | Carbon black | Black. |

Example 6

10 g. of the pigment preparation obtained according to Example 2 are dispersed in 30 g. of technical xylene mixture. This dispersion is combined with 60 g. of a solution of 17 g. of 65% ester-soluble nitrocellulose of medium viscosity having a nitrogen content of 10.8 to 12.2%, and 11 g. of a polyacrylic acid butyl ester of low viscosity in a mixture of 34 g. of butanol and 38 g. of butyl acetate. The zinc resinate coating of the pigment particles is readily dispersible in colloidal form in the above solvents.

A very homogeneous red lacquer which dries in the air is obtained which lacquer is suitable in particular for use as printing ink on aluminum foils or viscous films.

Example 7

2 g. of the pigment preparation obtained according to Example 1 are dissolved in 8 g. of styrene. 88 g. of a trialkylene glycol maleate containing 25% of styrene are added to this solution. 0.2 g. of cobalt naphthenate and 1.8 g. of methylethyl ketone peroxide are then added to the mixture; the mixture obtained is then poured into molds of the desired shape and polymerized.

Very homogeneously blue-colored shaped polymerized articles are obtained.

Similar results are obtained when replacing the aforesaid pigment preparation in Example 7 by the pigment preparation produced as described in Example 4.

Example 8

Example 1 is repeated, but in lieu of dimeric dihydroabietic acid, an identical amount of monomeric dihydroabietic acid is used. A blue pigment preparation of similar good properties as that of Example 1 is obtained.

Example 9

A blue, very homogeneous intaglio printing ink which is very suitable for the graphic industry, is obtained when 10 g. of the pigment preparation obtained according to Example 1 are stirred by means of a turbomixer into a solution of 40 g. of maleic resin as binding agent the condensation product of wood rosin, maleic anhydride and pentaerithrytol produced as described in Example IV of U.S. Patent 2,347,923 in 50 g. of toluene.

According to another independent aspect of this invention, pre-dispersed pigment preparations which are stable during long times of storage and are substantially free from deterioration by oxidation, and from causing blocking effects of the prints obtained therewith, which are readily dispersible in conventional binding agents and solvents being constituents of printing inks, free from solvents retention and hence quick drying, and especially suited for gravure printing techniques, to be applied on paper and the like cellulosic products, consist essentially of:

(a) a pigment powder the particle size of which does not exceed 15 microns, and (b) a coating about each of the pigment particles, which consists of the resinate of a water-soluble aromatic or araliphatic primary, secondary or tertiary mono- or polyamine, particularly of a secondary or tertiary monoamine or of a guanidine.

These amines are preferably compounds of the formulae

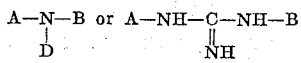

wherein

A represents an araliphatic or aromatic radical and
B and D independently each represent hydrogen, an aliphatic, cycloaliphatic, araliphatic or aromatic radical.

In araliphatic and aromatic radicals, the aryl ring chiefly represents a radical of the benzene series which can contain non-colouring, non-ionogenic substituents, e.g., low alkyl or alkoxy groups such as the methyl, ethyl, amyl, methoxy or ethoxy group, or halogens such as fluorine, bromine and, in particular, chlorine. Aliphatic radicals in the positions of B and D advantageously contain 1 to 5 carbon atoms and are preferably unsubstituted; if they are substituted, examples of substituents are low alkoxy groups such as the methoxy or ethoxy group, halogen up to the atomic number 35, the hydroxyl group or the cyano group. Chiefly the cyclohexyl group is mentioned as cycloaliphatic radical in the same positions.

Suitable araliphatic amines from which the acid addition products usable according to the invention are derived are, for example: monoaralkylamines such as benzylamine, 2-, 3- or 4-chlorobenzylamine, 2- or 4-bromobenzylamine, 3,4-dichlorobenzylamine, 2- or 4-methylbenzylamine; N-aralkyl-N-alkylamines such as N-benzyl-N-methylamine or N-(4-methylbenzyl)-N-methylamine; N-aralkyl-N-arylamines such as N-benzyl-N-phenylamine or N-(4-methylbenzyl)-N-2-methylphenylamine; N,N-diaralkylamines such as N,N-dibenzylamine; N,N-diaralkyl-N-alkylamines such as N,N-dibenzyl-N-methylamine; N,N-dialkyl-N-aralkylamines such as N,N-dimethyl-N-benzylamine; N,N,N-triaralkylamines such as N,N,N-tribenzylamine; N-alkyl-N-aralkyl-N-arylamines such as N-methyl-N-benzyl-N-phenylamine. The principal suitable aromatic amines are: monoarylamines such as phenylamine, 2-, 3- or 4-chlorophenylamine, 2- or 4-methylphenylamine, N-aryl-N-alkylamines such as N-methylphenylamine, N-methyl-4-methoxyphenylamine; N-aryl-N,N-dialkylamines such as N,N-dimethyl- or N,N-diethylphenylamine; N,N-diarylamines such as N,N-diphenylamine or N,N-di-(2-methylphenyl)-amine; N,N-diaryl-N-alkylamines such as N,N-diphenyl-N-methylamine or N,N-di-(2-methylphenyl)-N-methyl- or -N-ethylamine– N,N-di-alkyl-N-arylamines such as N,N-dimethyl-N-phenylamine or N,N-diethyl-N-phenylamine. Examples of araliphatic guanidines which can be used are N,N'-dibenzyl guanidine; suitable N-araliphatic-N'-aromatic guanidines are, e.g., N-benzyl-N'-4-methylphenyl guanidine; suitable aromatic guanidines are, e.g., N,N'-diphenyl- or N,N'-(di-2-methylphenyl)-guanidine.

Particularly favourable ammonium resinates useful as coatings under (b supra) are derived from araliphatic and aromatic amines or guanidines of the formula

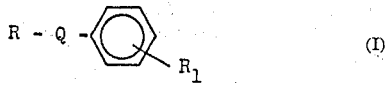

wherein R represents hydrogen, lower alkyl, phenyl or lower alkylphenyl, $R_1$ represents hydrogen or lower alkyl, namely, $R_1$ together with the phenyl ring to which it is attached is a phenyl, toluyl or xylyl radical, and Q represents one of the radicals of the formula

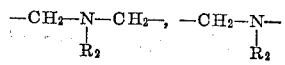

wherein $n$ is preferably linked to the benzene ring in Formula I, and

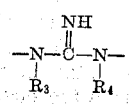

wherein each of $R_2$, $R_3$ and $R_4$ represents hydrogen or lower alkyl, the said resinate moiety being that of an acid which is monomeric or dimeric dihydroabietic or tetrahydroabietic acid, or a mixture of two or more of these acids, the weight ratio of (b) to (a) being at least 1:9 or higher depending on the total surface of the pigment powder.

Particularly suitable amines of Formula I are N-aralkyl-N-arylamines such as N-benzyl-N-phenylamine or N-methylbenzyl-N-phenylamine.

Advantageously the amines mentioned are used as acid addition products in the form of their hydrohalides such as hydrochlorides or hydrobromides, or also in the form of their acetates.

The acids whose radicals constitute the resinate moiety in the coating according to this aspect of the invention are those defined under (a) in the first aspect of the invention.

In this specification and in the appended claims, the term "lower" used in connection with aliphatic radicals means radicals of from 1 to 4 carbon atoms, unless expressly stated otherwise.

The same pigments as are used under the preceding aspect of the invention, are also suitable in this second aspect thereof.

According to this aspect of the invention an insoluble resinate of the aromatic amine of Formula I is precipitated onto the pigment particles by first preparing a 1 to 25%, advantageously an about 10%, aqueous solution of the water-soluble salt of the monomeric or polymeric di- or tetrahydroabietic acids or mixtures thereof, dispersing the pigment in this solution and then adding the water-soluble aromatic amine of Formula I capable of forming a difficultly soluble resinate, to the mixture obtained.

In all details, e.g. with regard to reaction conditions, and proportions of components, what has been said hereinbefore with regard to the preparation of pigment compositions according to the first aspect of the invention applies equally to the compositions according to this second aspect.

As a result, the water-insoluble resinate of the respective amine of Formula I precipitates and coats the individual particles of pigment. The pigment-resinate precipitate obtained is separated by filtration from the dispersion medium and soluble residual by-products are removed by washing out with water. In this way, pigment preparations of good color strength are obtained which, because they are free of fatty acid, do not deteriorate on storing, and because they are free of salt or other corroding components do not attack metal surfaces of apparatus, e.g. those of copper intaglio printing cylinders.

In contrast to those previously known, pigment preparations produced in this way from pigment and water-insoluble resinate of an amine of Formula I can easily be distributed by stirring for a short time in binding agents and solvents, even after they have been stored for several months.

The pigment preparations according to this aspect of the invention show very good solvent release, and thus dry very quickly; prints obtained therewith are substantially free from blocking effect.

The pigment preparations according to this aspect of the invention dissolve very well in most organic solvents, whereby such pigment preparations can be dispersed well in most binding agents or lacquer vehicles and solvent mixtures and are excellently suitable for use in the same type of printing colors, lacquers and plastics as have been enumerated under the first aspect of this invention. Examples of suitable binders and vehicles have been enumerated under the first aspect of the invention.

Examples of solvents in which the pigment preparations are readily dispersible are those mentioned under the first aspect of the invention, namely aromatic, hydroaromatic and aliphatic hydrocarbons (e.g. also terpene hydrocarbons); particularly however, mono- and poly-valent aliphatic alcohols, e.g. butanol, benzyl alcohol, octyl glycol, aliphatic ethers, e.g. ethylene glycol monobutyl ether, aliphatic esters, e.g. ethyl acetate, or aliphatic ketones such as methylisobutyl ketone.

Due to their easy dispersibility and stability to oxidations, the new pigment preparations can be used in many ways; in particular, also due to their low solvent retention they are well suited for intaglio printing, especially on paper, synthetic resin films and metal, especially aluminum foils.

The following non-limitative examples illustrate the second aspect of the invention. The temperatures are given in degrees centigrade and all parts and percentages are by weight unless otherwise stated.

*Example 10*

304 parts of dihydroabietic acid are boiled in 2680 parts of water and 56 parts of potassium hydroxide until a homogeneous solution is obtained which is purified by filtration. Then 1500 grams of a β-copper-phthalo-cyanine press cake of 20.0% solid content are stirred into the filtered solution by means of a turbomixer and after complete dispersion has been achieved the whole is mixed with a mixture of 197 parts of methylbenzylaniline, 100 parts of industrial 26.5% hydrochloric acid and 1670 parts of water. Stirring is continued for another 30 minutes, then the precipitate formed is filtered off, freed from salt by washing, and dried. A blue pigment composition is obtained which is easily dispersible in solvents used for printing inks and lacquers.

Pigment preparations having similar properties are obtained analogously to the method described in Example 10 when using in this example, instead of monomeric dihydroabietic acid, corresponding amounts of tetrahydroabietic acid or dihydroabietic acid, or when using, instead of N-(4-methylbenzyl)-N-phenylamine, corresponding amounts of benzylamine, 2-, 3- or 4-chlorobenzylamine, 2-, 3- or 4-bromobenzylamine, 3,4-dichlorobenzylamine, 2- or 4-methylbenzylamine, N-benzyl-N-methylamine, N-benzyl-N-phenylamine, N,N-dibenzylamine, N,N-dimethyl-N-benzylamine, N,N-dimethylphenylamine, 2- or 4-methylphenylamine, N,N-diphenylamine, N,N-di-(2-methylphenyl)amine, N,N-dimethyl-N-phenylamine, N,N'-dibenzyl guanidine, N-benzyl-N'-phenyl guanidine or N,N'-diphenyl guanidine.

*Example 11*

306 parts of tetrahydroabietic acid are boiled in 2700 parts of water and 40 parts of sodium hydroxide until a homogeneous solution is obtained which is purified by filtration. Then 8370 parts of 4-chloro-2-nitraniline→o-chloroacetoacetanilide in the form of a press cake of 35% solid content are worked in by means of a turbomixer, and, while stirring is continued, 211 parts of ethylbenzylaniline, dissolved in 100 parts of 36.5% hydrochloric acid and 1800 parts of water are added. After another 30 minutes stirring, the precipitate formed is filtered off, freed from salt by washing and dried. A yellow pigment composition is obtained which is easily dispersible in solvents used for intaglio printing inks.

Pigment preparations of similar good properties are obtained when repeating Example 10, but using in lieu of the pigment employed therein, an equal amount, of each of the dyestuffs, respectively, listed in the table following Example 5.

In an analogous manner as described in Example 10 there are obtained the following pre-dispersed pigment preparations, by using in the said example the corresponding amounts of the respective ingredients: (resinate stands for the salt of a mixture of monomeric and dimeric di- and tetra-hydroabietic acids, characterized by a thiocyanogen value of 35, a hydrogenation value of 71 ml./g. and an acid number of 162).

(a) 500 parts of di-o-toluyl-guanidinium resinate
3000 parts of Aniline Black (C.I. 50440)

This black pigment preparation is readily dispersible in colloid form in toluene, benzene, benzine, ethanol, acetone and ethyl acetate.

(b) 500 parts of dibenzyl-ammonium resinate
500 parts of the pigment bis-[4,5,6,7-tetrachloroisoindolin-1-one-3-ylidene]-diphenylenediamine-(4,4')

This orange pigment preparation is readily colloidally dispersible in toluene, benzene, benzine, ethanol, acetone and ethyl acetate.

(c) 300 parts of dimethyl-anilinium resinate
700 parts of the pigment bis-[4,5,6,7-tetrachloroisoindolin-1-one - 3 - ylidene] - 3,3' - dimethoxy - diphenylenediamine-(4,4')

This red pigment preparation is readily colloidally dispersible in toluene, benzine, ethanol, acetone and ethyl acetate.

(d) 400 parts of diphenyl-guanidinium resinate
600 parts of the pigment Isoviolanthrone Violet (isodibenzanthrone, Venkataraman, "Chemistry of Synthetic Dyes," II, p. 974 et seq.)

This violet pigment preparation is readily colloidally dispersible in toluene, benzene, benzine, ethanol, acetone and ethyl acetate.

(e) 500 parts of the resinate of an aminoalkyl-polyhydrophenanthrene mixture consisting of the amines of the formulas

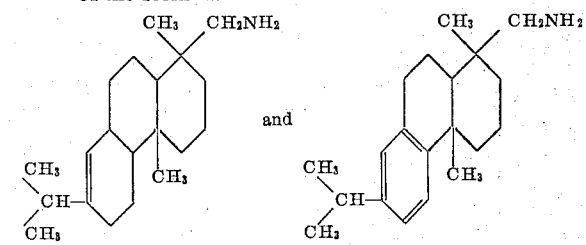

in molecular ratio of about 1:1, 2000 parts of rhodamine, laked with phosphorus-tungsten-molybdic acid.

The violet pigment preparation obtained can be dispersed readily in colloid form in binders, vehicles and solvents used in printing inks and lacquers.

*Example 12*

A blue, very homogeneous intaglio printing ink which is very well suited for the graphic industry, is obtained by repeating Example 9, but using 10 g. of the pigment preparation described in Example 10.

*Example 13*

A higher homogeneous yellow lacquer which dries in the air and is suitable, in particular, for printing inks for use on films, is obtained by repeating Example 6, but using in lieu of the pigment preparation of Example 2 an equal amount of the pigment preparation produced as described in Example 11.

*Example 14*

Very homogeneously blue-colored shaped articles are obtained by repeating Example 7, but using in lieu of the pigment preparation of Example 1 an equal amount of the preparation produced as described in Example 10.

We claim:
1. A pre-dispersed pigment preparation, consisting essentially of
  (a) a pigment powder the particle size of which does not exceed 15 microns, and
  (b) coating about each of the pigment particles, said coating consisting of a mixture of
    (i) a metal resinate the metal of which is a member selected from the metals of Groups II and

III of the Periodic Table of Mendeleyev, and the resinate moiety being that of an acid selected from the group consisting of a dihydroabietic acid and a tetrahydroabietic acid, and the partial esterification products of these acids with aliphatic saturated alcohols of from 1 to 6 carbon atoms and from 1 to 6 hydroxyl groups per molecule, said partial esterification products having an acid number of at least 80, and (ii) an ammonium resinate, the resinate moiety of which is that defined under (i) and the ammonium moiety of which is the radical of an organic amine, said ammonium resinate/metal resinate mixture being substantially insoluble in water, but at least colloidally dispersible in organic solvent constituent of gravure printing ink, the weight ratio of (b) to (a) being at least 1:9, and the weight ratio of metal resinate to ammonium resinate in the said mixture being in the range of from 1:9 to 4:1.

2. A pre-dispersed pigment preparation as defined in claim 1, wherein said metal is calcium.

3. A pre-dispersed pigment preparation as defined in claim 1, wherein said metal is zinc.

4. A pre-dispersed pigment preparation as defined in claim 1, wherein said resinate moiety is that of monomeric dihydroabietic acid.

5. A pre-dispersed pigment preparation as defined in claim 1, wherein said organic amine is a member selected from the class consisting of alkylated and alkenylated alkylenediamines, dialkylenetriamines, trialkylenetetra-amines and tetra-alkylenepentamines each containing at least one aliphatic substituent of at least 4 carbon atoms, but no substituent of more than 18 carbon atoms and each alkylene group thereof having from 2 to 4 carbon atoms.

6. A pre-dispersed pigment preparation as described in claim 1, wherein said metal is zinc, said resinate moiety is the anion of monomeric dihydroabietic acid, and said ammonium moiety is that of the fully hydrogenated condensation product of coconut oil fatty acid and trimethylenediamine in a mole ratio of 2:1.

7. Process for the production of a pigment preparation, which comprises mixing and thereby reacting
(a) an aqueous solution of a water-soluble salt of at at least one member of the group consisting of dihydroabietic, tetrahydroabietic acid and the partial esterification products of these acids, which solution is free from fatty acid or fatty acid salts, and
(b) a mixture of an aqueous solution of a water-soluble salt of a metal of Group II and Group III of the Periodic Table of Mendeleyev and an acid addition salt of an aliphatic amine,
wherein at least one of the reactant solutions (a) and (b) contains in suspension finely dispersed particles of the pigment to be treated, whereby in the resulting mixture a mixture of metal resinate and N-substituted ammonium resinate which is free from fatty acid and is insoluble in water is precipitated in the resulting mixture of (a) and (b) and forms a coating on each fine pigment particle in the mixture, the weight ratio of the metal resinate-ammonium resinate mixture to the pigment being at least about 1:9 and the weight ratio of metal resinate to ammonium resinate in the said mixture being in the range of about 1:9 to 4:1.

8. A pre-dispersed pigment preparation consisting essentially of
(a) a pigment powder the particle size of which does not exceed 15 microns, and
(b) a coating about each of the pigment particles, said coating consisting of the resinate of an aromatic amine of the formula

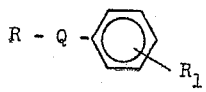

wherein R represents a member selected from the group consisting of hydrogen, lower alkyl, phenyl and lower alkylphenyl
$R_1$ represents a member selected from the group consisting of hydrogen and lower alkyl, and
Q represents a divalent radical selected from the group consisting of the groupings of the formulas

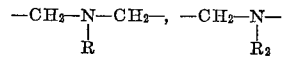

wherein N is linked to the benzene ring in the above formula, and

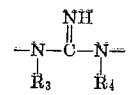

wherein each of $R_2$, $R_3$ and $R_4$ represents a member selected from the group consisting of hydrogen and lower alkyl, the resinate moiety being that of an acid selected from the group consisting of a dihydroabietic acid and a tetrahydroabietic acid, and the partial esterification products of these acids with aliphatic saturated alcohols of from 1 to 6 carbon atoms and from 1 to 6 hydroxyl groups per molecule, said partial esterification products having an acid number of at least 80,
the weight ratio of (b) to (a) being at least 1:9.

9. A pre-dispersed pigment preparation as defined in claim 8, wherein said resinate moiety is that of monomeric dihydroabietic acid.

10. A predispersed pigment preparation as defined in claim 8, wherein said resinate moiety is that of dimeric dihydroabietic acid.

11. A pre-dispersed pigment preparation as defined in claim 8, wherein said resinate moiety is that of monomeric tetrahydroabietic acid.

12. A pre-dispersed pigment preparation as defined in claim 8, wherein R is methylphenyl, Q is the grouping —$H_2$—$NR_2$—, and each of $R_1$ and $R_2$ are hydrogen.

13. A pre-dispersed pigment preparation as defined in claim 1, wherein said organic amine is a member selected from the group of (1) an aliphatic amine substituted by a member selected from the group consisting of alkyl of at most 20 carbon atoms, alkenyl of at most 20 carbon atoms, cycloalkyl, phenyl-lower alkyl, (2) morpholine, (3) piperazine, (4) piperidine, (5) 2-alkyl-substituted imidazoline wherein alkyl has up to 18 carbon atoms and (6) hydroxy-layer alkyl-imidazoline, said amine containing at least one aliphatic substituent of at least 4 carbon atoms.

14. A process for the production of a pre-dispersed pigment preparation, comprising reacting in a fatty acid-free aqueous medium containing finely distributed pigment, a water soluble salt of a member selected from the class consisting of a dihydroabietic acid, a tetrahydroabietic acid and a partial esterification product of one of these acids with an aliphatic saturated alcohol of from 1 to 6 carbon atoms and from 1 to 6 hydroxyl groups per molecule, said esterification product having an acid number of at least 80, with the watersoluble acid addition product of an araliphatic or aromatic amine which forms with said member a slightly or very slightly soluble salt, thereby precipitating the corresponding ammonium resinate formed by the ensuing reaction on the particles of said pigment to form a coating about each of said particles, the weight ratio of the ammonium resinate to the pigment being at least about 1:9.

References Cited

UNITED STATES PATENTS 3,025,179   3/1962   Holbein _____ 106—308

JAMES E. POER, *Primary Examiner.*

TOBIAS E. LEVOW, *Examiner.*